United States Patent [19]

Sommerfeld et al.

[11] 4,442,269

[45] Apr. 10, 1984

[54] STAGED COPOLYMERIZATION OF POLYESTERS

[75] Inventors: Eugene G. Sommerfeld, Mt. Laurel, N.J.; Andrew P. Stamegna, Claymont, Del.

[73] Assignee: E. I. Du Pont de Nemours & Company, Wilmington, Del.

[21] Appl. No.: 450,135

[22] Filed: Dec. 15, 1982

[51] Int. Cl.³ .............................................. C08L 67/02
[52] U.S. Cl. .................................... 525/440; 525/443; 525/444; 528/272; 528/296
[58] Field of Search ...................... 525/444, 440, 443; 528/272, 296

[56] References Cited

U.S. PATENT DOCUMENTS

| | | | |
|---|---|---|---|
| 3,449,467 | 6/1969 | Wynstra | 528/272 |
| 4,024,111 | 5/1977 | Thomas | 525/444 |
| 4,275,189 | 6/1981 | Danick | 525/444 |

FOREIGN PATENT DOCUMENTS 49-27091  7/1974  Japan ................................ 525/444

*Primary Examiner*—John C. Bleutge
*Assistant Examiner*—Patricia Short

[57] ABSTRACT

Polyester copolymers prepared by a non-equilibrium, two-stage process conducted without external catalysts have relatively high polydispersity and low viscosity, permitting the preparation of high solids paints.

12 Claims, No Drawings

STAGED COPOLYMERIZATION OF POLYESTERS

BACKGROUND

The present invention concerns a polymerization process for producing branched polyesters with characteristics especially useful in high solids paints.

Environmental and economic concerns often make it desirable to minimize the quantity of organic solvent released to the atmosphere in the application of paints, such as to automobiles, either in single color coats or in color coat/clear coat or other applications. One way to do this is to make a paint with higher solids content which contains less solvent to evaporate. Several properties must be balanced and reconciled in developing such a paint. Higher polydispersity polymers sometimes permit the preparation of higher solids paints, but it is necessary to keep the viscosity, rheology and other properties of the paint under control. Polydispersity is defined as the ratio of the weight average molecular weight, Mw, to the number average molecular weight, Mn. Polymers having higher Mw often make paints with higher viscosity unless the polydispersity is also high. Such high viscosities can make it more difficult to apply the paint by conventional techniques such as spraying.

It would be desirable to have polymers which can be used to make paints with relatively high solids content and low viscosity.

SUMMARY OF THE INVENTION

The present invention provides a nonequilibrium, two-stage polymerization process conducted without external catalysts for producing polyester copolymers having a linear segment with terminal hydroxyl groups and a number average molecular weight (Mn) of at least about 500 and a branched segment with lateral hydroxyl groups wherein, in the first stage of the process, one half of the carboxyl groups of a diacid or a diacid anhydride are reacted in approximately stoichiometric proportions with one of (A) one half of the hydroxyl groups of the linear segment and (B) 10-80% of the hydroxyl groups of the branched segment to form a first reaction product, and then, in the second stage of the process, the other half of the carboxyl groups of the first reaction product are reacted in approximately stoichiometric proportions with the hydroxyl group of the other of (A) and (B).

Preferably, after the first stage but before the second stage of polymerization the branched segment has a number average molecular weight of 750-1000, a hydroxyl number of 175-300, an acid number of 20-60 if the carboxyl group has been reacted first with the branched segment or less than 5 if the carboxyl group has been reacted first with the linear segment, and a number average functionality of 2.5-11; and the linear segment has a number average molecular weight of 500-3000, a hydroxyl number of 15-300, an acid number of less than 5 or 20-60, respectively, and a number average functionality of 1.1-2.

The first stage reaction is preferably conducted at at least 100° C., more preferably at at least 150° C. The second stage reaction is preferably conducted at at least 200° C.

The polyester copolymers themselves and coating compositions comprising such copolymers and melamine/formaldehyde, di- or poly-isocyanate, or urea/formaldehyde crosslinkers are also part of the invention.

DETAILED DESCRIPTION

In contrast to single-stage batch or continuous polymerization processes or externally catalyzed polymerization processes, the present invention provides a means for producing specific polymer architecture in structured branched copolyesters, permitting obtaining high polydispersity and high solids paints with viscosity low enough for practical application such as by spraying.

In one embodiment of the invention, in a first stage reaction a diacid anhydride is reacted with lateral hydroxyl groups of a branched polyester prepolymer or oligoester, referred to hereafter as a branched segment. The proportions are such that about one half of the carboxyl groups in the diacid anhydride react with about 10 to 80%, preferably about 25% of the hydroxyl groups in the branched segment.

Then in a second stage reaction a linear polyester prepolymer, oligoester or segment with terminal hydroxyl groups is reacted with the reaction product of the first stage reaction. The proportions are such that the hydroxyl groups on one end of the linear segments (or one half of the total hydroxyl groups on the linear segments) react with the remaining carboxyl groups on the diacid anhydrides in the reaction product of the first stage reaction. These reactions are endothermic condensation polymerizations which can be terminated by cooling. The progress of the reactions can be followed or determined by measuring the acid number.

If external polymerization catalysts, such as dibutyl tin oxide, otherwise known as exogenous catalysts, were present during either or both stages, or if both reactions were conducted in a single stage, the resulting polymer would be quite different, having a scrambled molecular weight, lower polydispersity, and less desirable properties for making high solids paints. This has been demonstrated experimentally. While it can be said that the present polymerization reactions are somewhat autocatalytic, with one of the reactants acting as a catalyst which is consumed in the reaction, thereby quenching or killing the catalytic action when the reactant is consumed, this is quite a different phenomena than external or exogenous catalysis, excluded by the present invention, wherein catalytic effects continue until equilibrium results are achieved with their characteristic less desirable broad molecular weight distributions and other effects. Among the undesirable effects of reaction to equilibrium would be increased transesterification, scrambling of the polymer structure, and premature crosslinking leading toward gellation and unusable product. Indeed, while not desiring to be committed to any particular hypothesis, it appears that the present invention creates a kinetically controlled polymerization that can be stopped before reaching equilibrium, thereby giving a more desirable product. In contrast, the equilibrium product of a catalyzed or single stage reaction is thermodynamically determined, has a less specific polymer architecture, and is less desirable for certain purposes.

Among other uses, copolyesters of the present invention are particularly useful as the binder in a color coat over both rigid and flexible substrates in automobiles, to be covered with a clear coat finish to add aesthetic appeal.

The linear segments preferably can be provided by the following monomers:

neopentyl glycol
1,6-hexanediol
Esterdiol-204, a commercial diol produced by Union Carbide
o-phthalic anhydride
isophthalic acid
adipic acid
azelaic acid.

The branched segments preferably can be provided by the following monomers:
neopentyl glycol
1,6-hexanediol
trimethylolpropane
o-phthalic anhydride
isophthalic acid
adipic acid
azelaic acid.

Preferably the linear and branched segments are linked together through the following capping agents:
o-phthalic anhydride
succinic anhydride
glutaric anhydride.

The nature of the invention will now be further demonstrated by the following examples in which percentages and proportions are given by weight except for ratios which are molar and except as indicated otherwise.

In the examples, the molar ratios of constituent groups in the oligoesters and the acids or their anhydride equivalents are given in the following terms:
diol/triol = $X_1$
polyol/diacid = $X_2$
aromatic diacid/aliphatic diacid = $X_3$,
diol/diacid = $X_4$.

The monomers used include the following:

| | |
|---|---|
| neopentyl glycol | 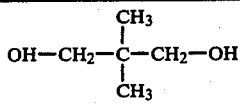 |
| 1,6-hexanediol | HO—CH$_2$—CH$_2$—CH$_2$—CH$_2$—CH$_2$—CH$_2$—OH |
| o-phthalic anhydride | 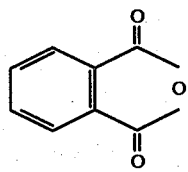 |
| isophthalic acid | 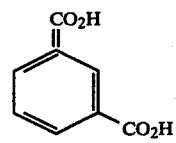 |
| adipic acid | HO$_2$C—(CH$_2$)$_4$—CO$_2$H |
| azelaic acid | HO$_2$C—(CH$_2$)$_7$—CO$_2$H |
| trimethylolpropane | 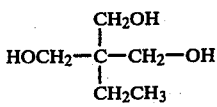 |
| succinic anhydride | |
| glutaric anhydride | |

The following Table of Contents can aid in understanding the examples.

TABLE OF CONTENTS

| Ex. | Subject | and Purpose |
|---|---|---|
| 1 | Branched Oligoester 1 | Used as prepolymer for staged polyesters used in flexible color coats and clear coats. |
| 2 | Linear Oligoester 1 | Used as prepolymer in combination with branched oligoester 1 for same end uses. |
| 3 | Staged Polyester 1A | Low molecular weight/high acid number staged polyester. Prepared by combination of branched oligoester 1 and linear oligoester 1 via o-phthalic anhydride (mole ratio = 1:1:1). Used in flexible color coat and clear coat. |
| 4 | Staged Polyester 1B | High molecular weight/low acid number staged polyester. Used and prepared as in 1A. |
| 5 | Branched Oligoester 2 | Used as prepolymer in studies done in staged addition. |
| 6 | Linear Oligoester 2 | Lower (or medium molecular weight) linear esterdiol. Used in staged polyesterification with branched oligoester 2 to note the effect of lowering molecular weight of linear segment on properties of staged polymers |
| 7 | Staged Polyester 2A | Using succinic anhydride. |
| 8 | Staged Polyester 2B | Using glutaric anhydride. |
| 9 | Branched Oligoester 3 | Used as prepolymer in studies done in staged addition. |
| 10 | Linear Oligoester 3 | |
| 11 | Staged Polyester 3A | Using carboxylated branched segment. |
| 12 | Staged Polyester 3B | Using carboxylated linear segment. |
| | Compar. Batch Tests Polymerization | Control experiment in conjunction with 3A and 3B. |
| | Coating Variations | Varying compositions in color coat. Varying compositions in clear cost. |
| | Color Coat/Clear Coat Formulations | |
| 13 | | Flexible polyester color coat. |
| 14 | | Flexible polyester clear coat. |
| 15 | | Rigid polyester clear coat. |
| | Application | |
| 16 | | Flexible polyester color coat/flexible polyester clear coat. |
| 17 | | Flexible polyester color coat/rigid polyester clear coat. |

EXAMPLE 1

Branched Oligoester 1

This is an example of the preparation of a branched segment in which the chemical composition has been balanced so as to provide an optimum hardness/flexibility balance in subsequent coating compositions. This segment will be co-condensed with the linear segment described in Example 2 to provide subsequent staged copolyesters. The copolymerizations of these two segments will be described in Examples 3 and 4.

$X_1 = 1.17$
$X_2 = 1.3$
$X_3 = 0.33$

To a 12-liter flask equipped with a mechanical stirrer, electric heating mantle, nitrogen inlet tube, packed column, Dean-Stark water separator, batch and vapor thermometers and water cooled condenser are charged the following ingredients:

2184 g neopentyl glycol (21 moles)
2430 g trimethylol propane (18 moles)
1245 g isophthalic acid (7.5 moles)
4230 g azelaic acid (22.5 moles)

The mixture is heated to distilling at temperatures of 140° C. to 260° C. until 1080 g (60 moles) of water are collected. The resultant branched oilogmer has the following physical constants:

Acid no. = 1.35 mg KOH at 100% wt solids
Theoretical hydroxyl no. = 224 mg KOH at 100% wt solids
Measured hydroxyl no. = 228 mg KOH
Mn = 1000 (vapor phase osmometry)
Theoretical Mn = 1001
GPC (gel permeation chromatography) molecular weight distribution:
 number average—Mn = 1600
 weight average—Mw = 6200
 Z average—Mz = 18,000
 polydispersity—d = 3.88
First order glass transition temperature (Tg) = −39° C. (differential scanning colorimetry)

EXAMPLE 2

Linear Oligoester 1

This linear segment was prepared with a chemical composition and molecular weight to provide the optimum balance of solution properties and physical properties in the staged polyesters of Examples 3 and 4.

To a 12-liter flask equipped as in Example 1 are added the following ingredients:

3993.60 g neopentyl glycol (38.4 moles)
1135 g 1,6-hexanediol (9.6 moles)
1494 g isophthalic acid (9 moles)
3948 g azelaic acid (21 moles)

The mixture is heated to distilling at temperatures of 145°–265° C. until 1080 g (60 moles) of water are collected. The resultant linear oligoester has the following physical properties:

Acid no. = 1.25 mg KOH of 100% wt solids
Theoretical OH no. = 213 KOH at 100% wt solids
Measured OH no. = 210 mg KOH
Theoretical Mn = 528
Mn (vapor phase osmometry) = 540
GPC molecular weight distribution:
 Mn = 725
 Mw = 1300
 Mz = 2300
 d = 1.79
Tg = −52° C.

EXAMPLE 3

Staged Polyester 1A

This copolyester is the product of the co-condensation of the polymers from Examples 1 and 2. The polymer is prepared by initial carboxylation of the branched segment with o-phthalic anhydride. The stoichiometry of this step is such that 25% of the available hydroxyl groups of the branched segment are converted to carboxyl groups via the ring opening reaction with the anhydride. The mole ratio of the components is 1 mole branched segment/1 mole phthalic anhydride. The next step is the co-condensation of this intermediate with the linear oligomer from Example 2. The final stoichiometry of total reaction is 1/1/1 (branched segment/anhydride/linear segment). The condensation is carried out to an acid number value between 10–15 mg KOH at 100% weight solids.

To a 12-liter flask equipped as in previous examples are added 4800 g (4.8 moles) of branched oligomer 1, 711 g (4.8 moles o-phthalic anhydride and 160 g of xylene. The mixture is heated at 125° C.–150° C. for 1 hour. There should be no water removal at this stage. Then 2535 g (4.8 moles) of linear oligoester 1 are added and the entire mixture is heated to distill 60–65 g of water (approx. 3.5 moles) at temperatures of 220°–250° C. The resin is diluted with 1250 g of methyl ethyl ketone (MEK). The physical properties of the resulting structured copolyester are as follows:

Acid no. = 10–15 mg KOH at 100% weight solids
Theoretical OH no. = 145 mg KOH at 100% weight solids
Measured OH no. = 143 mg KOH
Wt % solids = 85
Gardner-Holdt viscosity = Z to Z2 at 25° C.
GPC molecular weight distribution:
 Mn = 1600
 Mw = 9500
 Mz = 32,000
 d = 5.94
Tg = −32° C.

This polymer can then be blended with melamine and with various amounts of the polymer in Example 4 to provide flexible metallic color coats and/or hard and flexible clear enamels.

EXAMPLE 4

Staged Polyester 1B

This polymer is prepared in the same manner as Example 3 except that the polymerization in the last stage is carried out to an acid number of less than 5. This polymer is higher in molecular weight and provides more flexible films than staged polyester 1A. If the same quantities of Example 3 are used, then at least 86.4 g (4.8 moles) of water must be collected to achieve the desired acid #. The polymer exhibits the following properties:

Acid no. = 1 to 5 mg KOH at 100% wt solids
Theoretical OH no. = 135 mg KOH at 100% wt solids
Measured OH no. = 132 mg KOH
Wt % solids = 85
Gardner-Holdt viscosity = Z2 to Z3 at 25° C.
GPC molecular weight distribution:
 Mn = 2100
 Mw = 16,000
 Mz = 68,300
 d = 7.62
Tg = −34° C.

EXAMPLE 5

Branched Oligoester 2

The branched oligomer described in this example is co-condensed with the linear oligomer of Example 6 in the manner described in Example 4. This branched segment has been made more flexible by the introduction of 1,6-hexanediol as a flexible monomer.

$X_1 = 1.17$
$X_2 = 1.3$
$X_3 = 0.67$

To a 5-liter flash equipped as in previous examples are added:
- 488.4 g neopentyl glycol (4.69 moles)
- 554.17 g 1,6-hexanediol (4.69 moles)
- 1086.8 g trimethylolpropane (8.05 moles)
- 1513.4 g azelaic soda (8.05 moles)
- 891 g isophthalic acid (5.37 moles).

The entire mixture is heated to distill 483 g (26.84 moles) of water at temperatures of 150° C.–270° C. The resultant oligoester has the following physical constants:

Acid no. = 0–5 mg KOH at 100% wt solids
Theoretical OH no. = 223 KOH at 100% wt solids
Measured OH no. = 220 mg KOH
Theoretical Mn = 1006
Mn (vapor phase osmometry) = 1000
GPC molecular weight distribution:
  Mn = 1200
  Mw = 5940
  Mz = 19,800
  d = 4.93
  Tg = −33° C.

EXAMPLE 6

Linear Oligoester 2

This linear oligoester is prepared at higher molecular weight than the oligomer described in Example 2. The purpose of this preparation is to allow for a more flexible and harder linear segment in subsequent staged polymer of Examples 7 and 8.

$X_3 = 0.67$
$X_4 = 1.3$

To a 5-liter flask equipped as before are added:
- 1123.2 g neopentyl glycol (10.8 moles)
- 566.4 g 1,6-hexanediol (4.8 moles)
- 796.8 g isophthalic acid (4.8 moles)
- 1353.6 g azelaic acid (7.2 moles).

The mixture is heated to distill 432 g (24 moles) of water at temperatures of 150° C.–270° C. The resultant linear oligoester has the following physical constants:

Acid no. = 0–5 mg KOH at 100% wt solids
Theoretical OH no. = 118 mg KOH at 100% wt solids
Measured OH no. = 116 mg KOH
Theoretical Mn = 950
Mn (vapor phase osmometry) = 980
GPC molecular weight distribution:
  Mn = 1100
  Mw = 2170
  Mz = 3700
  d = 1.97
  Tg = −41° C.

EXAMPLE 7

Staged Polyester 2A Using Succinic Anhydride

This polymer was prepared in such a way as to provide a stoichiometry balance of 1 mole branched segment Example 5/1 mole succinic anhydride/1 mole linear segment of Example 6. Again this stoichiometric balance allows for reaction of 25% of the available hydroxyl functionality of the branched segment with anhydride followed by extension with the linear segment. This polymer provides fairly hard and very flexible pigmented and clear enamels when crosslinked with melamines.

To a 5-liter flask equipped as before are added 1500 g (1.49 moles) of branched oligoester 2 of Example 5. (1.49 moles) of succinic anhydride and 61 g of xylene. The mixture is heated at 125° C.–150° C. for 1 hour and then 1411 g (1.49 moles) of linear oligoester 2 are added. The entire mixture is heated to distill 27 g (1.49 moles) of water at 210° C.–260° C. The resin is diluted with 475 g of MEK to yield a polyester having the following physical properties:

Acid no. = 0–5 mg KOH at 100% wt solids
Theoretical OH no. = 110 mg KOH at 100% wt solids
Measured OH no. = 92 mg KOH
% weight solids = 85
Gardner-Holdt viscosity = Z4 at 25° C.
GPC molecular weight distribution:
  Mn = 2600
  Mw = 23,000
  Mz = 108,000
  d = 8.85
  Tg = −36° C.

EXAMPLE 8

Staged Polyester 2B Using Glutaric Anhydride

The succinic anhydride in the previous example is replaced by 170 g (1.49 moles) of glutaric anhydride. This anhydride leads to lower viscosity resins than succinic anhydride without affecting the film properties of the subsequent enamels. As a result of this, glutaric anhydride may be a preferred capping agent over succinic and o-phthalic anhydride for certain end uses.

Acid no. = 0–5 mg KOH at 100% wt solids
Theoretical OH no. = 109 mg KOH at 100% wt solids
Measured OH no. = 108
% weight solids = 85
Gardner-Holdt viscosity = Z2 at 25° C.
GPC molecular weight distribution:
  Mn = 2500
  Mw = 21,000
  Mz = 71,000
  d = 8.40
  Tg = −40° C.

The following examples serve to illustrate the effect of staging the polyesterification vs. using a batch or continuous polymerization. The polymers described herein may or may not be used in coatings formulations, however, the theoretical aspects of staged polyesterification will be illustrated.

EXAMPLE 9

Branched Oligoester 3

$X_1 = 1.17$
$X_2 = 1.3$
$X_3 = 1.0$.

To a 5-liter flask equipped as before are added the following ingredients:
- 725 g neopentyl glycol (7 moles)
- 810 g trimethylolpropane (6 moles)
- 830 g isophthalic acid (5 moles)
- 940 g azelaic acid (5 moles).

The mixture is heated to distill 360 g (20 moles) of water at temperatures of 160° C.–250° C. The resultant oligoester has the following physical constants:

Acid no. = 0–5 mg KOH at 100% wt solids
Theoretical OH no. = 228 mg KOH at 100% wt solids
Measured OH no. = 226

Theoretical Mn-983
Mn (vapor phase osmometry)=950
GPC molecular weight distribution:
Mn=1300
Mw=8000
Mz=32,000
d=6.15
Tg=−13° C.

This branched oligomer is then co-condensed with the linear segment prepared in the next example according to the procedures of Examples 11 and 12.

EXAMPLE 10

Linear Oligoester 3

$X_3=0$
$X_4=1.2$.

To a 5-liter flask equipped as before are added the following ingredients:
1622.4 g neopentyl glycol (15.6 moles)
2444 g azelaic acid (13 moles).

The mixture is heated to distill 468 g (26 moles) of water at temperatures of 155° C.–260° C. The resultant linear oil oligoester has the following physical constants:
Acid no.=0–5
Theoretical OH no.=81
Measured OH no.=86
Theoretical Mn=1385
Mn (vapor phase osmometry)=1300
GPC molecular weight distribution:
Mn=1500
Mw=3100
Mz=5200
d=2.07
Tg=−52° C.

EXAMPLE 11

Staged Polyester 3B Carboxylated Branched Segment

This polymer is prepared by first reacting 25% of the hydroxyl groups of branched oligoester 3 of Example 9 with o-phthalic anhydride to affect 25% carboxylation of the branched segment. The linear oligoester 3 of Example 10 is then added and the copolymerization is carried out. The stoichiometry of the reaction is 1 mole branched segment/1 mole 2-phthalic anhydride/1 mole linear segment.

To a 5-liter flask equipped as in previous examples are added 737 g (0.75 moles) of branched oligoester 3, 111.4 g (0175 moles) of o-phthalic anhydride and 17 g of xylene. The mixture is heated at 125° C.–150° C. for 1 hour and then 1038 g (0.75 moles) of linear oligomer 3 are added. The entire mixture is then heated to distill 13.5 g (0.75 moles) of water at 220° C.–270° C. The resin is then diluted with 314 g of xylene to provide a polyester resin with the following physical properties:
Acid no.=0.50
Theoretical OH no.=90
Measured OH no.=88
% weight solids=85
Gardner-Holdt viscosity=Z7 at 25° C.
GPC molecular weight distribution:
Mn=2700
Mw=110,000
Mz=933,000
d=40.7
Tg=−34° C.

EXAMPLE 12

Staged Polyester 3B Carboxylated Linear Segment

This example describes the reversal of steps used in Example 11. The linear oligoester 3 of Example 10 is first carboxylated with o-phthalic anhydride to an extent of 50% carboxylation, and then enough branched oligoester of Example 9 is added to affect esterification of 25% of the branched oligoester's hydroxyl groups with the half-carboxylated linear oligoester. The stoichiometry is the same as in Example 11.

To a 5-liter flask equipped as before are added 1800 g (1.30 moles) of linear oligoester 3, 193.2 g (1.30 moles) of o-phthalic anhydride and 40 g of xylene. The mixture is heated at 125° C.–150° C. for 1 hour at which point 1279 g (1.3 moles) of branched oligoester 3 are added. The mixture is heated at 220° C.–270° C. until 23.4 g (1.30 moles) of water have been removed. The resin is diluted with 520 g of xylene to afford a polyester with the following physical properties:
Acid no=0.75
Theoretical OH no.=90
Measured OH no.=93
% weight solids=85
Gardner-Holdt viscosity=Z6 at 25° C.
GPC molecular weight distribution:
Mn=2400
Mw=37,000
Mz=208,000
d=15.4
Tg=−36° C.

COMPARATIVE TEST

Batch or Continuous Polymerization

This test shows batch or continuous polyesterification of the monomers present in the starting materials of Examples 11 and 12. The stoichiometric balance of monomers is adjusted so as to match the amounts introduced from the branched and linear oligomers and the o-phthalic anhydride quite closely.

To a 5-liter flask equipped as before are added:
650.10 g neopentyl glycol (6.25 moles)
202.5 g trimethylolpropane (1.5 moles)
207.5 g isophthalic acid (1.25 moles)
912.5 g azelaic acid (4.85 moles)
111.36 g o-phthalic anydride (0.75 moles)
$X_1=4.17$
$X_2=1.13$
$X_3=0.41$.

The mixture is heated at 155° C.–270° C. to distill 233.1 g (12.95 moles) of water. The resin is then diluted with 327 g of xylene to yield a polyester resin with the following properties:
Acid no=0.82
Theoretical OH no.=90
Measured OH no.=94
% weight solids=85
Gardner-Holdt viscosity=Z5 at 25° C.
GPC molecular weight distribution:
Mn=2100
Mw=19,000
Mz=79,000
d=9.05
Tg=−30° C.

It is important to note that the theoretical hydroxyl numbers of the polymers are the same between this test and Examples 11 and 12. However, Gardner-Holdt solution viscosity versus percent solids by weight behavior of the three polymers is very different depending upon the mode of preparation, with the viscosity of the batch test being higher for its molecular weights than would be expected from Examples 11 and 12 if they had produced materials of similar molecular weight. The molecular weight distributions vary also depending upon the mode of polymerization. The changes in molecular weight distributions as a function of polymerization process are dependent upon the chain length (or Mn) of the linear segment, holding the molecular weight of the branched component constant. With a Mn of the linear segment as low as Mn 400, the GPC distributions of all polymers and the viscosity/solids behavior prepared by staged or continuous processes are identical. The Mn of the linear segment needs to be at least about 500 for the advantages of the invention to become manifest.

Similar results are obtained with the staged polymerizations of the previous examples if polymerization catalysts such as dibutyl tin oxide are added in catalytic quantities.

COATING VARIATIONS

Varying Compositions in Color Coat

Polyester/Melamine Ratio: 90/20–50/50
Pigment/Binder Ratio: 2/100–100/100
Melamine Variations:
Cymel 1158 produced by American Cyanamid
Resimene 717 produced by Monsanto
Resimene 735 produced by Monsanto
Cymel 325 produced by American Cyanamid
Resimene 747* and 755 produced by Monsanto
*Requires 0.2–0.5% strong acid to obtain acceptable cure and film properties at 250° F.×30 minutes bakes.

Examples of strong acids:
p-toluene sulfonic acid
dodecylbenzene sulfonic acid
dinonylnaphthalene disulfonic acid
phosphoric acid
oxalic acid.

Varying Compositions in Clear Coat

Polyester 1A/Polyester 1B ratio and Polyester/Melamine ratio can be varied to accommodate necessary properties for application over flexible and/or rigid substrates.

Blends of various melamines are possible to accommodate cure requirements such as underbake and overbake properties.

COLOR COAT/CLEAR COAT FORMULATIONS

EXAMPLE 13

Flexible Polyester Color Coat

| Component | Weight (g) | % Binder Solids |
|---|---|---|
| Staged Polyester 1A - Ex. 3 | 85.62 | 35 |
| Staged Polyester 1B - Ex. 4 | 85.62 | 35 |
| Resimene 717 | 102.6 | 30 |
| Tinuvin 328 from Ciba Geigy | 6.84 | 2 |
| Polymeric hindered amine light stabilizer | 3.42 | 1 |
| Butyl alcohol | 37.6 | 11 |
| Silicone oil flow enhancement agent | 0.34 | 0.10 |
| Fumed silica | 10.26 | 3 |
| Alcoa 7575 | 34.2 | 10 |
| Polyester/Melamine Ratio = 70/30 by weight | | |
| Pigment/Binder = 10/100 by weight | | |

| Component | Weight (g) | % Binder Solids |
|---|---|---|
| Thinned with a 70/30 by weight mixture of MEK/amylacetate | | |
| % weight solids at spray = 45 | | |
| % volume solids at spray = 34 | | |
| Spray viscosity = 20–25 seconds Fisher #2 cup. | | |

EXAMPLE 14

Flexible Polyester Clear Coat

| Component | Weight (g) | % Binder Solids |
|---|---|---|
| Staged Polyester 1A -Ex.3 | 164.70 | 35 |
| Staged Polyester 1B - Ex. 4 | 164.70 | 35 |
| Resimene 717 | 146.3 | 30 |
| Tinuvin 328 | 8 0 | 2 |
| Polymeric hindered amine light stabilizer | 4.0 | 1 |
| Silicone oil | 0.6 | 0.15 |
| Butyl Alcohol | 60 | 15 |
| Polyester/melamine Ratio = 70/30 | | |
| Thinned with a 70/30 by weight mixture of amylacetate/xylene | | |
| % weight solids = 53.5 at spray | | |
| % volumn solids = 45.5 at spray | | |
| Spray viscosity = 35 seconds #2 Fisher cup | | |

EXAMPLE 15

Rigid Polyester Clear Coat

| Component | Weight (g) | % Binder Solids |
|---|---|---|
| Staged Polyester 1A - Ex. 3 | 706 | 60 |
| Resimene 717 | 488 | 40 |
| Tinuvin 328 | 20 | 2 |
| Polymeric hindered amine light stabilizer | 10 | 1 |
| Silicone oil | 1 | 0.1 |
| Butyl alcohol | 150 | 15 |
| Polyester/melamine Ratio = 60/40 | | |
| Thinned with a 70/30 by weight mixture of amylacetate xylene | | |
| % weight solids at spray = | | |
| % volume solids at spray = 48 | | |
| Spray viscosity = 35 seconds #2 Fisher cup | | |

APPLICATION OF POLYESTER COLOR COAT/CLEAR COAT SYSTEMS

EXAMPLE 16

Flexible Polyester Color Coat/Flexible Polyester Clear Coat

Coatings applied wet-on-wet on flexible reactive injection molded (RIM) substrate were tested with film builds (dry-after bake) of: color coat=0.5 mils and clear coat=1.6 mils. The baking schedule was 250° F. for 30 minutes Appearance
20° gloss=89
60° gloss=98
Distinctness of image (DOI)-65

These measurements were made with a Garnder Instruments Glossmeter and a Hunter DOI Meter.

Tukon Hardness was 2.2 Knoop.

The −20° F. flexibility was measured by bending a 1"×6" strip of coated substrate over a cold ½" cylindrical mandrel. Panel was cooled in a −20° F. deep freezer along with the mandrel for 4 hours. Flexibility test showed no cracking of the coating.

A crosshatch adhesion test showed no loss of adhesion.

Toughness was measured by attempting to cause cohesive adhesion failure by marring film with a knife held perpendicular to the film and dragged across it. It was difficult to mar the film with the knife.

Exposure for 96 hours in a condensing humidity cabinet set at 100° F. and 100% relative humidity showed no gloss loss or discoloration of the coating and no loss of adhesion or toughness. Excellent chip resistance after chilling to −10° F. for 4 hours was obtained in a standard Gravelometer test.

There was no film distortion or softening after 200 repeated double rubs with methyl ethyl ketone, and there was no distortion or softening after allowing 3 drops of xylene to evaporate from a test sample.

In accelerated weathering tests for 1500 hours exposure to quartz lamp ultraviolet light, there was 70% retention of 20° gloss reflectance and no loss of room temperature flexibility.

EXAMPLE 17

Flexible Polyester Color Coat/Rigid Polyester Clear Coat

Wet-on-wet coatings applied on reinforced rim (PRIM) and sheet molded compound (SMC) were tested with film builds (dry-after bake) of: color coat=0.6 mils and clear coat=1.6 mils. The baking schedule was 250° F. for 30 minutes.

Appearance
PRIM: 20° gloss=90, 60° gloss=98, DOI=60
SMC: 20° gloss=92, 60° gloss=99, DOI=64.

The Tukon Hardness on SMC was 7.7 Knoop.

The 0° F. flexibility over PRIM was measured by bending a 4"×12" coated panel to a 90° angle over a cold 1" cylindrical mandrel. Both the coated panel and the mandrel are chilled in a 0° F. freezer for 4 hours. No cracking of the coating was noted.

A crosshatch adhesion test showed no loss of adhesion on both PRIM and SMC substrates. Toughness on PRIM and on SMC was measured by attempting to mar film by dragging a U.S. 10-cent coin across the coating while holding the dime at a 45° angle to the plane of the substrate. It was difficult to mar the film with the coin over both substrates.

Exposure for 96 hours in a condensing humidity cabinet set at 100° F. and 100% relative humidity showed no gloss loss or discoloration of the coating and no loss of adhesion or toughness over both PRIM and SMC.

On both substrates, excellent chip resistance after chilling to −10° F. for 4 hours was obtained in a standard Gravelometer test.

There was no film distortion or softening after 200 repeated double rubs with methyl ethyl ketone over both PRIM and SMC, and there was no distortion or softening after allowing 3 drops of xylene to evaporate from test samples on both RRIM and SMC.

We claim:

1. A non-equilibrium, two-stage polymerization process conducted without external catalysts for producing polyester copolymers having a linear segment with terminal hydroxyl groups and a number average molecular weight (Mn) of at least about 500 and a branched segment with lateral hydroxyl groups wherein
   in the first stage of the process one half of the carboxyl groups of a diacid or a diacid anhydride are reacted in approximately stoichiometric proportions with one of (A) one half of the hydroxyl groups of the linear segment and (B) 10–80% of the hydroxyl groups of the branched segment to form a first reaction product, and then
   in the second stage of the process the other half of the carboxyl groups of the first reaction product are reacted in approximately stoichiometric proportions with the hydroxyl group of the other of (A) and (B).

2. The process of claim 1 wherein the reaction of the first stage is conducted at temperatures of at least about 100° C. and the reaction of the second stage is conducted at temperatures of at least about 200° C.

3. The process of claim 1 wherein in the first stage said carboxyl groups are reacted with the hydroxyl groups of the branched segment.

4. The process of claim 1 wherein in the first stage said carboxyl groups are reacted with the hydroxyl groups of the linear segment.

5. A polyester copolymer produced by the process of claim 1.

6. A polyester copolymer produced by the process of claim 2.

7. A polyester copolymer produced by the process of claim 3.

8. A polyester copolymer produced by the process of claim 4.

9. A polyester copolymer of claim 6 wherein after the first stage and before the second stage of polymerization
   the branched segment has a number average molecular weight of 750–1000, a hydroxyl number of 175–300, an acid number of 20–60, and a number average functionality of 2.5–11; and
   the linear segment has a number average molecular weight of 500–3000, a hydroxyl number of 15–300, an acid number of less than 5 and a number average functionality of 1.1–2.

10. A polyester copolymer of claim 7 wherein after the first stage and before the second stage of polymerization
    the branched segment has a number average molecular weight of 750–1000, a hydroxyl number of 175–300, an acid number of less than 5, and a number average functionality of 2.5–11; and
    the linear segment has a number average molecular weight of 500–3000, a hydroxyl number of 15–300, an acid number of 20–60 and a number average functionality of 1.1–2.

11. A coating composition comprising
    A. a polyester copolymer of claim 9, and
    B. 10–50% by weight based on A plus B of a crosslinker selected from melamine/formaldehyde resins, di- and poly-isocyanate resins, and urea formaldehyde resins.

12. A coating composition comprising
    A. a polyester copolymer of claim 10, and
    B. 10–50% by weight based on A plus B of a crosslinker selected from melamine/formaldehyde resins, di- and poly-isocyanate resins, and urea formaldehyde resin.

* * * * *